United States Patent [19]

Brückner et al.

[11] Patent Number: 5,799,811
[45] Date of Patent: Sep. 1, 1998

[54] INSULATED FLASK WITH ATTACHMENT FOR ASSOCIATE ASSEMBLY

[75] Inventors: Andreas Brückner, Stuttgart, Germany; Ian Ferris, Berkshire, England

[73] Assignee: Dart Industries Inc., Orlando, Fla.

[21] Appl. No.: 653,137

[22] Filed: Jun. 7, 1996

[51] Int. Cl.[6] ............. B65D 23/10; A47J 41/00; A47G 19/23
[52] U.S. Cl. ............. 215/386; 215/13.1; 215/396; 215/10; 215/DIG. 7; 206/217; 206/543; 206/546; 220/758; 220/759
[58] Field of Search ............. 215/10, 12.1, 396, 215/13.1, 386, DIG. 7; 229/402; 220/758, 759; 206/519, 543, 546, 509, 217; 16/114; 294/27.1, 31.2

[56] References Cited

U.S. PATENT DOCUMENTS

| D. 203,615 | 2/1966 | Metzler et al. |
|---|---|---|
| D. 325,687 | 4/1992 | Embree ............. D7/510 |
| 610,902 | 9/1898 | Hetland ............. 220/756 X |
| 1,427,259 | 8/1922 | Burton ............. 215/12.1 |
| 1,445,056 | 2/1923 | Altenberg ............. 215/12.1 |
| 1,665,179 | 4/1928 | Savage ............. 215/12.1 |
| 1,695,540 | 12/1928 | Edquist ............. 215/12.1 |
| 1,855,039 | 4/1932 | Wetmore ............. 215/12.1 |
| 2,207,543 | 7/1940 | Knapp ............. 215/13.1 |
| 2,543,581 | 2/1951 | Koski . |
| 2,598,747 | 6/1952 | Alex . |
| 2,805,561 | 9/1957 | Emmert et al. . |
| 2,855,120 | 10/1958 | Bramming ............. 215/DIG. 7 X |
| 2,981,562 | 4/1961 | Long . |
| 2,989,203 | 6/1961 | Bramming ............. 215/12.1 |
| 3,028,984 | 4/1962 | Bramming ............. 215/12.1 |
| 3,076,575 | 2/1963 | Leslie-Smith ............. 215/DIG. 7 X |
| 3,191,819 | 6/1965 | Smith ............. 16/114 R X |
| 3,371,807 | 3/1968 | Clouser et al. . |
| 3,373,888 | 3/1968 | Fuller ............. 215/12.1 X |
| 5,224,634 | 7/1993 | Graham . |

FOREIGN PATENT DOCUMENTS

| 2354007 | 5/1975 | Germany ............. 229/402 |
|---|---|---|
| 618282 | 2/1961 | Italy ............. 215/12.1 |
| 1747019 | 7/1992 | U.S.S.R. . |
| 291930 | 6/1928 | United Kingdom . |
| 441829 | 4/1934 | United Kingdom ............. 215/12.1 |
| 602185 | 5/1948 | United Kingdom ............. 215/12.1 |
| 674179 | 6/1952 | United Kingdom ............. 215/12.1 |
| 2039214 | 8/1980 | United Kingdom . |
| 2267145 | 11/1993 | United Kingdom . |
| WO9417709 | 8/1994 | WIPO . |

*Primary Examiner*—Sue A. Weaver
*Attorney, Agent, or Firm*—John A. Doninger

[57] ABSTRACT

An insulated flask has a cup assembly and a handle assembly alternately mounted on the flask body, the cup assembly comprising two telescopically stacks cups releasably mounted to the flask body by an annular collar, the cups having nested handles. The handle assembly includes an annular collar mountable to the flask body in a similar manner as the cup collar, and an elongate handle fixed to and extending from the handle assembly collar.

16 Claims, 7 Drawing Sheets

INSULATED FLASK WITH ATTACHMENT FOR ASSOCIATE ASSEMBLY

BACKGROUND OF THE INVENTION

Insulated flasks, vacuum bottles, and the like are conventionally of a vertically elongate cylindrical configuration with a stopper-closed mouth or pouring spout at the upper end thereof. The flask will normally include one or two removal drinking cups mounted over the stoppered upper end with the outermost cup including a cup handle which may be used to carry the closed flask.

A flask with a cup assembly as above described has a rather compact configuration, with no protuberances other than for a possible slight projecting of the cup handle. The flask is thus particularly adapted for storing within a lunch box or the like. However, while convenient to carry and store, the conventional flask is relatively awkward to handle at such time as the contents are to be poured therefrom. Basically, the cylindrical body itself has to be grasped in the hand and upended for a discharge of the contents through the mouth or pouring spout. In a flask of any appreciable diameter, the direct grasping of the cylindrical body can be difficult and may actually require use of a second hand to balance the flask.

It has been proposed to provide handles for such insulated flasks. However, such handles, extending laterally from the body of the flask, detract from the compact easily stored nature of the flask.

SUMMARY OF THE INVENTION

The insulated flask or container of the present invention comprises an assemblage, in the form of a kit having selectively mountable cups and a handle assembly, which provides for use of the flask with mounted cups in the manner of a conventional vacuum bottle or the like, and for use as a pouring pitcher using a quick-mounted separate pouring handle assembly which replaces the cups. The cup assembly and the handle assembly interchangeably mount in substantially the same manner, utilizing a collar which drops over the upper portion of the flask and rotates to a locked position.

Each collar conforms to the configuration of the skirt portion of the neck unit of the flask immediately therebelow. This is particularly desirable in mounting the handle for use of the flask in more formal situations, such as at the dinner table in the home, in that the mounted handle collar suggests a permanently mounted handle notwithstanding the instant removability thereof.

The neck unit to which the cup assembly and handle assembly individually mount, includes an upwardly opening neck, usually with a pour spout, an outwardly and downwardly flaring shoulder and a depending skirt outwardly and downwardly arcing to encircle the upper portion of the flask shell and mount the neck unit thereon. An upwardly directed support ledge is provided peripherally about the neck unit immediately above the skirt and is adapted to receive, individually and selectively, either the lower annular edge of the cup collar or the lower annular edge of the handle collar. Both collars include inwardly directed elongate lugs immediately above the lower edge thereof which, upon a seating and rotation of the collar, engage within a groove peripherally about the neck unit shoulder and sufficiently spaced above the support ledge to accommodate the lugs.

The cup assembly preferably includes two cups with the innermost cup including the aforementioned collar which is integrally formed with and flares outward from the upper end of a generally cylindrical cup body, thus providing for a mounting of the inner cup as well as a substantial enlargement of the capacity of the cup. The second or outer cup of the cup assembly is basically a cylindrical cup which nests over the cylindrical portion of the inner cup and includes inwardly directed lugs which rotatably engage beneath corresponding ribs on the exterior of the inner cup. In order to provide for a further interlocking of the cups and a strengthened cup handle for the flask, both cups are provided with handles which nest upon a rotation of the outer cup to its locked position on the inner cup.

The collar of the handle includes an open annular upper end which encircles the neck immediately below the open mouth for free access to the stopper and to allow for unimpeded pouring of the contents. The handle itself is rigid with and preferably integrally formed with the exterior surface of the collar and depends therefrom along an arc to terminate in a free lower end.

A secondary lug and rib mounting means is provided between each collar and the neck adjacent the upper end of the collar to further stabilize the collar on the flask.

Both collars, when mounted, define an arcuate continuation of the neck unit skirt, and, at least with regard to the handle collar, includes a similar outer surface treatment to present, with the skirt, an appearance of continuity.

Other features and details of the invention will be apparent as the invention is more fully hereinafter described.

DESCRIPTION OF PREFERRED EMBODIMENTS

Referring now more specifically to the drawings, the insulated flask 10 of the invention comprises a vertically elongate rigid outer shell 12 protectively enclosing an upwardly opening vacuum bottle 14 extending upwardly through the open upper end of the shell 12. The lower end of the bottle is normally mounted on a support 16 extending upward from the bottom of the shell 12, the bottle having the upper discharge end portion thereof centrally retained and stabilized by a neck unit 18. The neck unit seals to the upper end of the shell 12 peripherally thereabout, and extends upwardly and inwardly therefrom into engagement with the neck and discharge end of the bottle 14. This general structure is standard in such containers.

A flask as above described will also normally include an inverted cup mounted over the neck unit.

In the present invention, the insulated flask 10, in the manner of a kit, includes interchangeable and selectively usable associate assemblies comprising respectively a cup assembly 20 and a handle assembly 22. Both assemblies are accommodated on the neck unit 18 in substantially the same manner.

Figure 5:
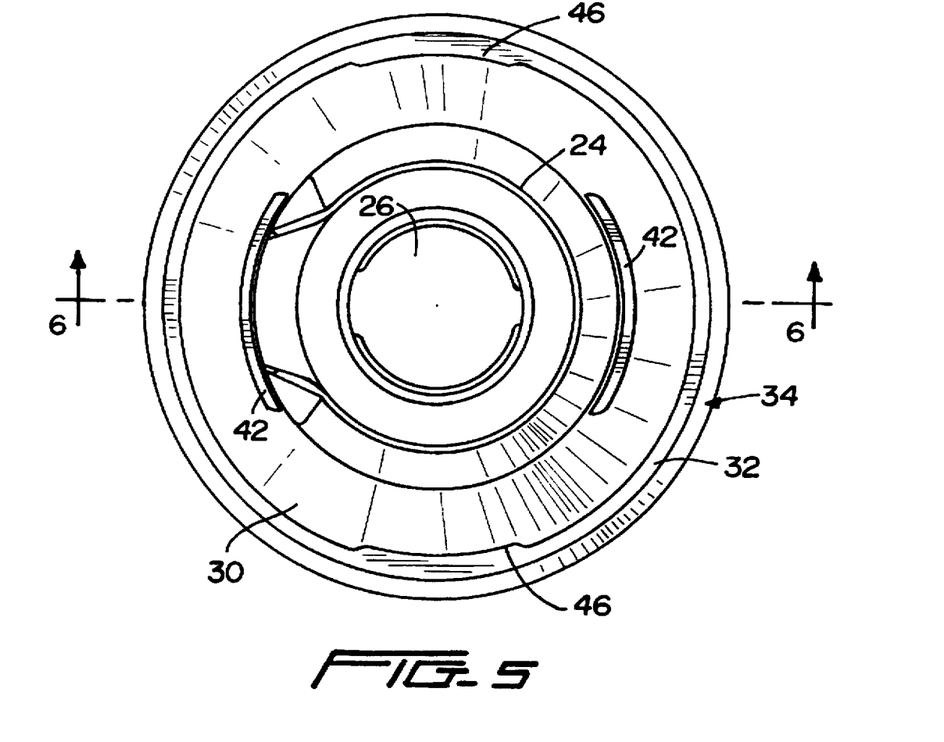
FIG. 5 is a top plan view of the neck unit of the flask.
Figure 6:
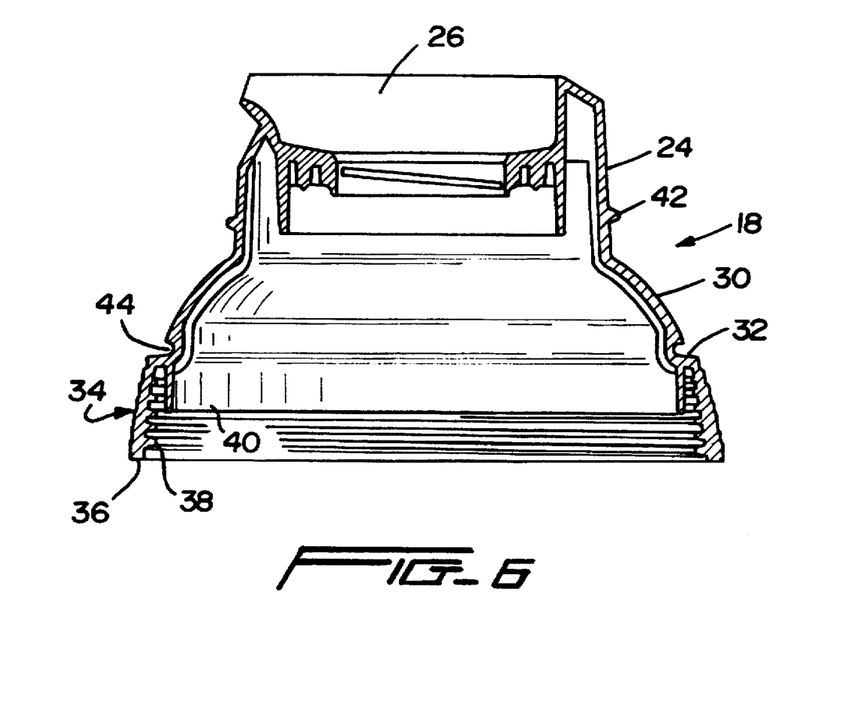
FIG. 6 is a vertical cross-sectional view through the neck unit taken substantially on a plane passing along line 6—6 in FIG. 5.

The neck unit 18, detailed in FIGS. 5 and 6 and illustrated in cooperative relationship to other components in several additional views, includes an upper cylindrical neck 24 defining an upward pour mouth or spout area 26 which, in a conventional manner, aligns with the open mouth of the vacuum bottle 14 for a direct discharge of the contents of the bottle. As noted in selected figures, an appropriate stopper 28 will removably seal within the open mouth of the bottle 14.

A shoulder 30, integral with the lower end of the cylindrical neck 24, arcs outwardly and downwardly therefrom peripherally thereabout, terminating in a radially outwardly directed support ledge 32.

A peripheral skirt 34, outwardly offset from the lower peripheral edge portion of the shoulder 30 and integral with the outer edge of the support ledge 32, depends therefrom along an arcuate path to a free outer lower edge 36. The outer surface of the skirt 34 is provided with a surface treatment which may be in the form of a series of annular ribs or steps for the full height thereof. The inner surface of the skirt 34 is provided with a series of screw threads 38 which compliment corresponding threads on the outer surface of the shell 12 adjacent the upper end thereof, thus enabling a tight sealed screw-mounting of the neck unit 18 to the shell 12. As will be noted in selected sectional details of the neck unit 18, the threads 38 are of constantly varying depth to accommodate the outward and downward arcing of the skirt 34 and the substantially vertical wall of the shell 12. For further stabilization of the neck unit 18 to the shell 12, an inner retaining flange 40 is provided radially inward of the skirt 34 for engagement with the inner surface of the shell 12 about the open upper end thereof as the neck unit is mounted.

In order to releasably mount the associate assemblies, either the cup assembly 20 or the handle assembly 22, the neck unit 18 is provided with dual locking means. First, at a point slightly above the shoulder 30, the neck or neck portion 24 is provided with a pair of diametrically opposed elongate locking ribs 42, each extending about a minor portion of the circumference of the outer surface of the neck 24. In addition, the shoulder 30, peripherally thereabout and immediately above the support ledge 32, includes a radially outwardly opening annular groove 44. At diametrically opposed portions of the groove, offset at approximately 90 degrees to the ribs 42, the shoulder 30, for a minor portion of the circumferential length thereof, is recessed or has a pair of recesses 46 above the groove 44, allowing for direct vertical communication therewith. The depth of the recesses corresponding to the depth of the groove.

Turning now to the cup assembly 20, it will be seen that this assembly comprises an inner cup 48 and an outer cup 50. As will be appreciated, the cups 48 and 50 have been illustrated as inverted and positioned for mounting on the neck unit of the flask.

Figure 10:
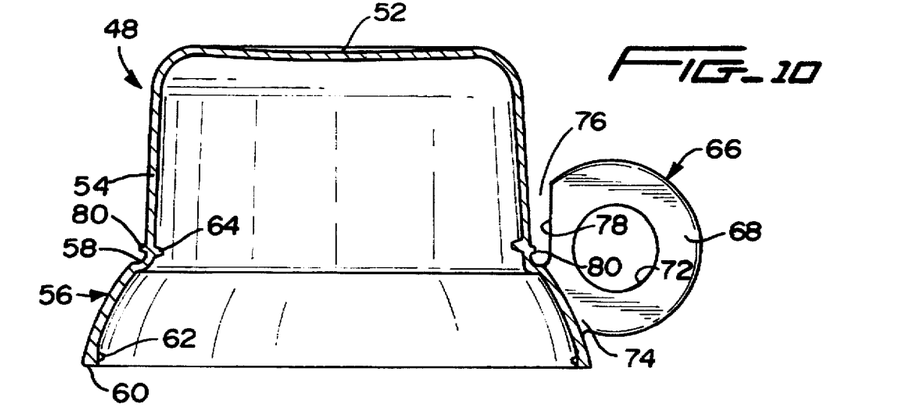
FIG. 10 is a vertical cross-sectional view through the inner cup of the cup assembly taken substantially on a plane passing along line 10—10 in FIG. 11.
Figure 11:
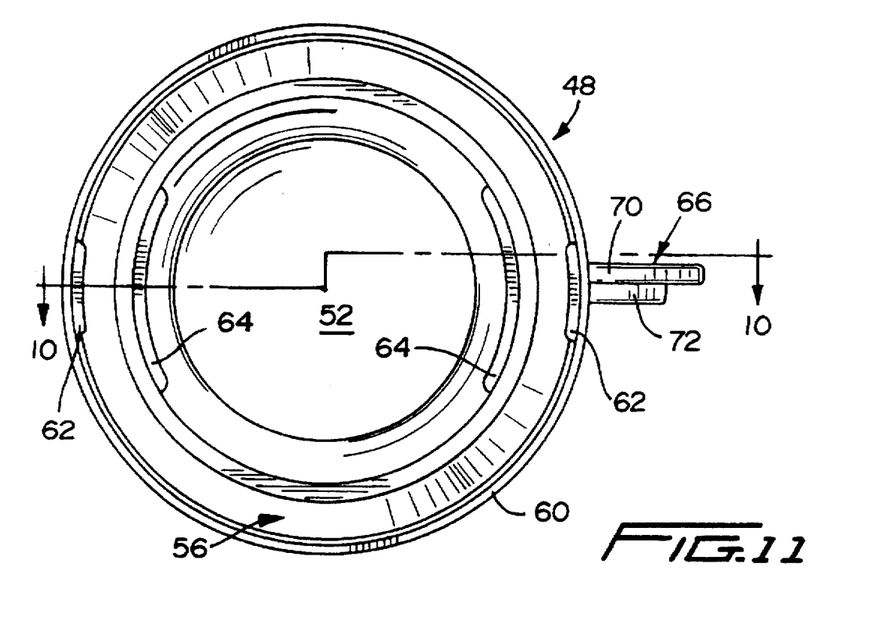
FIG. 11 is a bottom plan view of the inner cup.

The inner cup 48 includes a cylindrical cup body with a slightly concave bottom 52 and an annular wall 54 integral with the periphery of the bottom 52 and extending therefrom. Integral with the outer edge of the cylindrical wall 54 is an annular collar 56, the inner edge thereof being slightly outwardly offset from the annular wall 54 to define an annular support shelf or ledge 58. The collar 56 has an outwardly arcing configuration generally following the arcuate configuration of the neck skirt 34 and terminates in an outer peripheral edge 60 which is of a thickness generally equal to the radial width of the support ledge 32 of the neck unit 18.

In order to releasably lock the inner cup 48 to the neck unit 18 and hence the flask shell 12, the collar 56, adjacent the outer edge 60 thereof and at diametrically opposed locations, includes a pair of elongate locking lugs 62 extending along a minor portion of the inner circumference of the collar 56 and of a length to be received through the opposed shoulder recesses 46 for rotation into the groove 44 on the neck unit 18. Similar locking lugs 64 are defined on the inner surface of the cup wall 54 and project inwardly therefrom along arcs constituting a minor portion of the circumference of the wall 54. These lugs 64 are positioned slightly spaced from the exterior support shelf 58 and are generally vertically aligned with the lugs 62. So arranged, and with the inner cup 48 oriented above the neck unit 18 as illustrated in the exploded view of FIG. 2, the cup is moved downward over the neck unit with the lower positioned lugs 62 engaging through the recesses 46 and with the lugs 64 aligning just below the neck locking ribs 42. When so positioned the inner cup 48 is rotated to move the lugs 62 into the annular groove 44 while at the same time moving the cup lugs 64 immediately beneath the locking ribs 42. Such a relationship will be best seen in the enlarged detail of FIG. 12, and provides for a positive locking of the inner cup 48 to the neck unit 18.

The inner cup 48, in order to facilitate the handling thereof, includes a relatively compact handle 66 formed of a rigid annular panel 68 with an outer substantially circular periphery defined by a short laterally turned rigidifying flange 70, and an inner finger opening defined by a substantially wider laterally turned annular inner flange 72 forming a projecting hub. The handle 66 is integrally formed with the cup collar 56 through a short integral extension portion 74 extending from the outer periphery of the handle 66 to the exterior of the collar 56 immediately below the support shelf 58 and centrally aligned with one set of locking lugs 62 and 64. As will be best noted in FIG. 10, the handle 66 extends from the shoulder and lies adjacent the cylindrical wall 54 of the cup, thus minimizing the outward projection of the handle 66 and positioning the handle at least partially radially inward of the maximum diameter of the inner cup 48 at the outer edge 60 of the collar 56. As the outer cup 50 is to be telescopically received over the inner cup 48, and seated on the support ledge 58 thereof, an accommodating space or slot 76 is provided between the cylindrical wall 54 of the inner cup 48 and the adjoining outer peripheral edge of the handle 66. This is achieved by forming that portion of the outer periphery of the handle 66 adjacent the cup wall 54 with a linear length or extent 78 which substantially parallels the wall 54 in outwardly spaced relation thereto. This linear extent 78 extends upward from the support shelf 58 to provide free access thereto by the outer cup 50.

Finally, the inner cup 48 includes a pair of diametrically opposed arcuate locking lugs 80, each extending along a minor portion of the circumference of the cup wall 54 and in general radially outward alignment with the inner locking lugs 64. As will be noted in FIG. 10, one of the pair of lugs 80 projects into the cup-accommodating slot 76 adjacent the handle 66.

Figure 7:
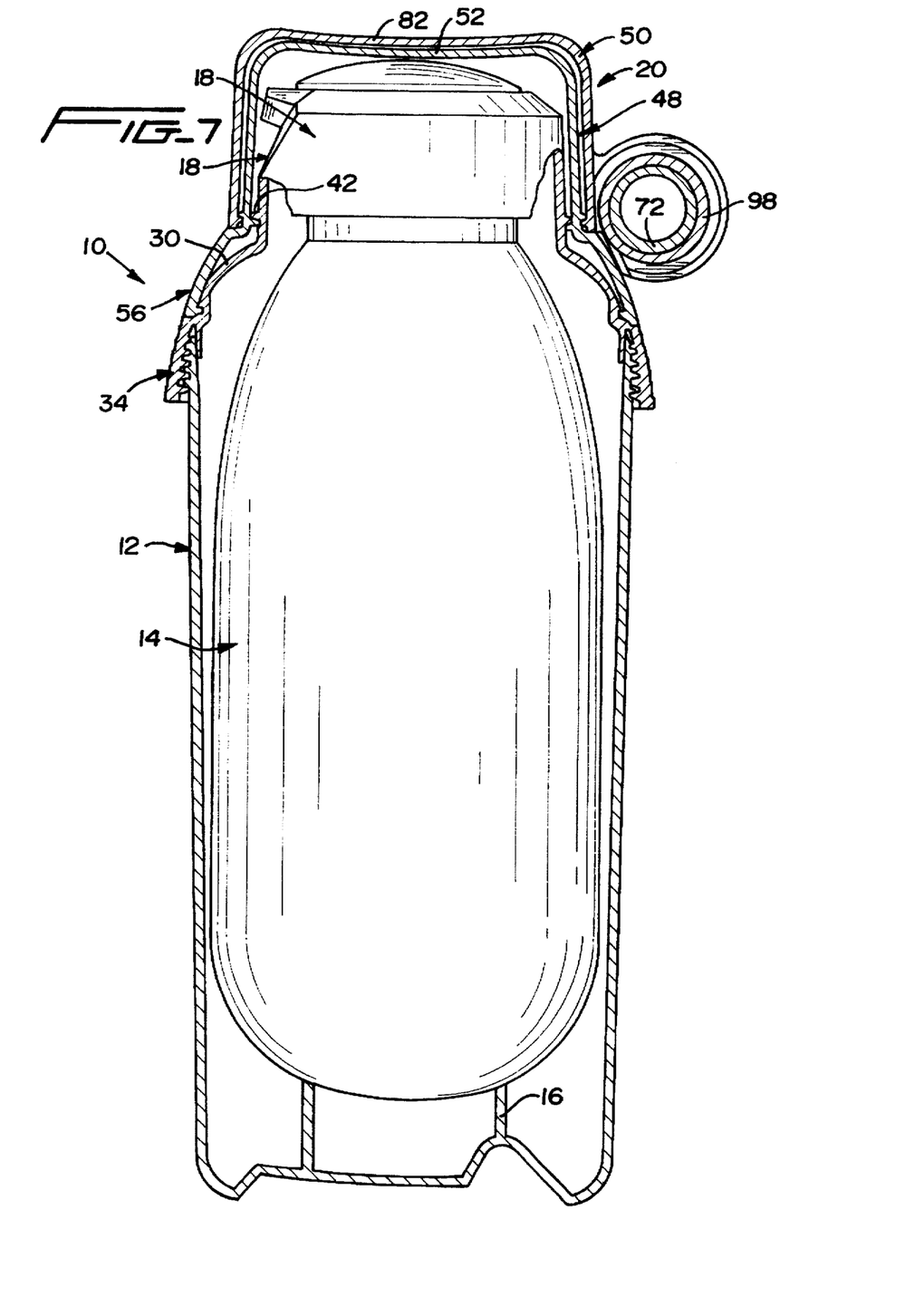
FIG. 7 is an enlarged vertical cross-sectional view through the flask and cup assembly mounted thereon.
Figure 8:
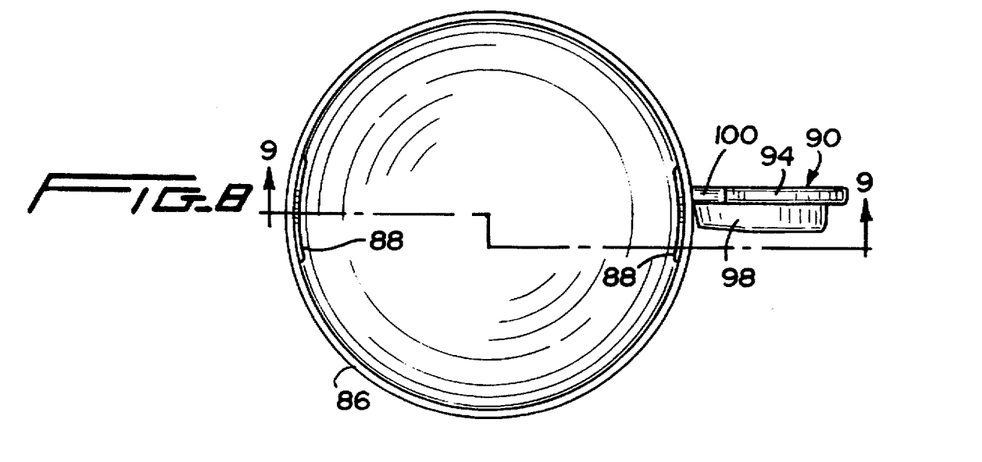
FIG. 8 is a bottom plan view of the outer cup of the cup assembly in its mounting position.

The outer cup 50, similar to the inner cup 48, includes a slightly concave bottom 82 with an integral cylindrical wall 84 extending therefrom. The size and configuration of the bottom 82 and wall 84 of the cup 50 are such as to nest completely over the bottom 52 and wall 54 of the inner cup 48 as will be best seen in FIG. 7. The outer peripheral edge 86 of the wall 84 will seat on the support shelf or ledge 58 of the inner cup 48 when the cups are assembled. As will be appreciated from the drawings, the walls 54 and 84 of the cups can be slightly outwardly flared to facilitate a nesting of the cups.

The outer cup 50 includes a pair of diametrically opposed locking lugs 88 integral with and extending inward from the inner surface of the cup wall 84. These lugs 88 are elongate with each extending along a minor portion of the circumference of wall 84 to engage beneath the corresponding external lugs 80 on the inner cup 48 to secure the outer cup 50 thereto. Basically, the outer cup 50 is positioned with the internal lugs 88 thereof rotatably offset from the lugs 80 to allow for a seating of the outer peripheral edge 86 of the outer cup on the support ledge 58. Upon a full seating of the outer cup, the outer cup is rotated to bring the locking lugs 88 into position beneath the lugs 80 and thus prevent withdraw of the outer cup 50. As will be recognized, the relationship between the width of the slot 76 and the thickness of the outer cup wall 84, including the locking lugs 88, is such as to allow for accommodation of the outer cup wall 84 within the slot 76.

The outer cup 50 is also provided with a loop-defining handle 90. The handle 90 is formed by a flat annular panel 92 having a laterally turned outer flange 94 forming a substantially circular outer periphery, and a laterally turned inner flange 96 defining a circular finger opening. Both flanges 94 and 96 are of equal height and of a height substantially equal to the height of the outer flange 70 of the handle 66.

Figure 9:
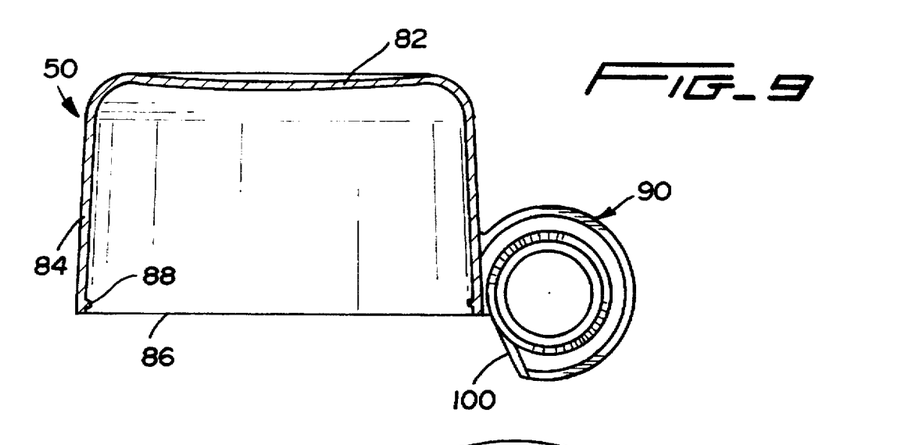
FIG. 9 is a cross-sectional view of the outer cup taken substantially on a plane passing along line 9—9 in FIG. 8.

The handle 90 also includes an integral annular flange 98 extending from the panel 92 intermediate the flanges 94 and 96 and forming a hub of a substantially greater height. The handle 90, noting FIGS. 1 and 9 in particular, has a portion of the outer periphery thereof integral with the wall 84 of the cup 50 and extends both radially outward from the wall 84 and longitudinally beyond the outer edge 86 of the cup wall. This handle 90 is to lie adjacent and immediately outward of the collar 56 of the inner cup 48. Hence, the outer periphery of the handle 90 includes a linear length or extent 100 at an angle from the outer edge 86 to overlie the outer surface of the collar 56 in closely spaced adjacent relation thereto. This will possibly best be seen in FIG. 7.

Figures 1, 2:
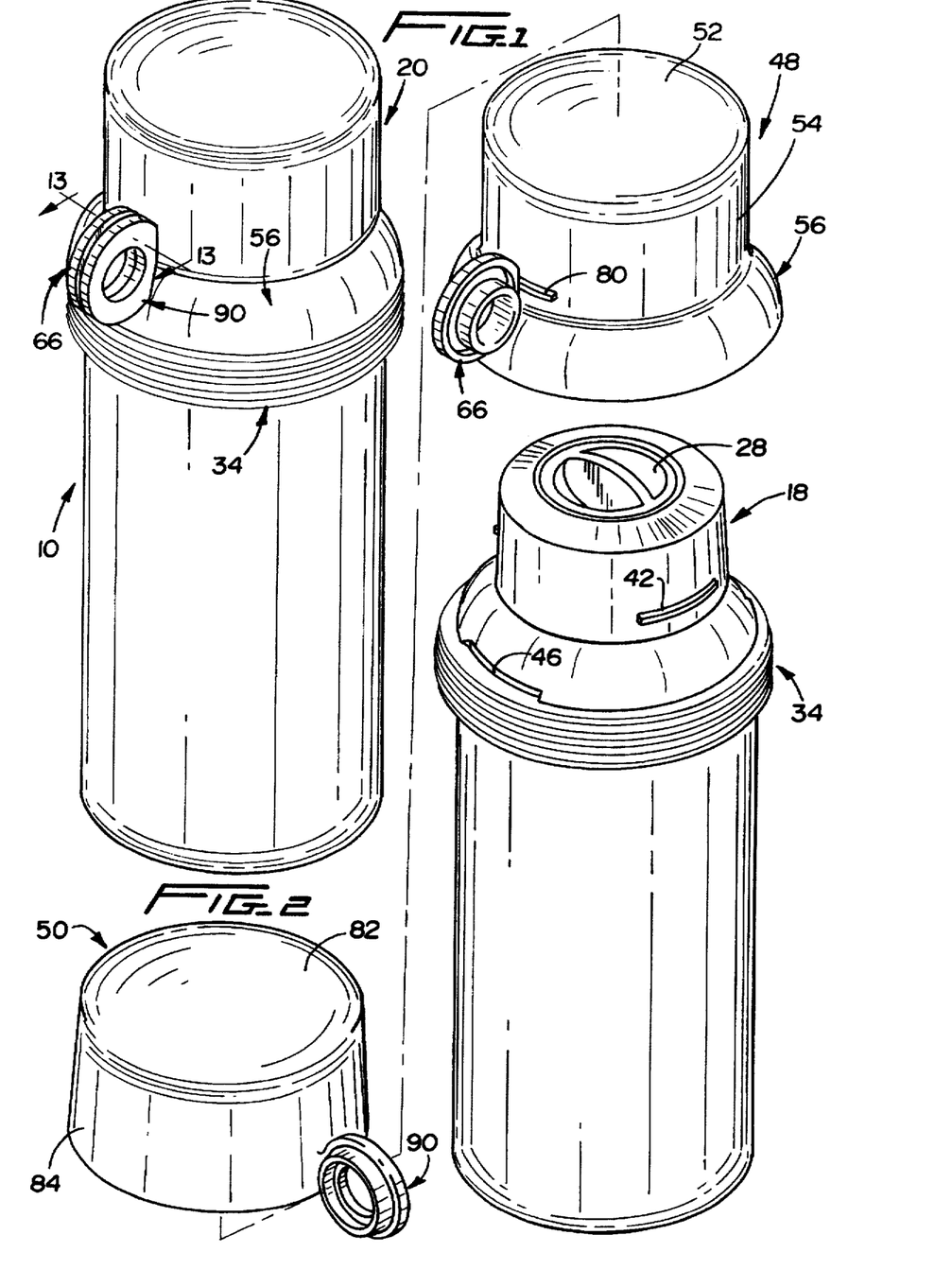
FIG. 1 is a perspective view of the flask of the invention with the assembly of two nested cups mounted thereon.
FIG. 2 is a view of the flask with the cups of the cup assembly exploded therefrom.
Figures 3, 4:
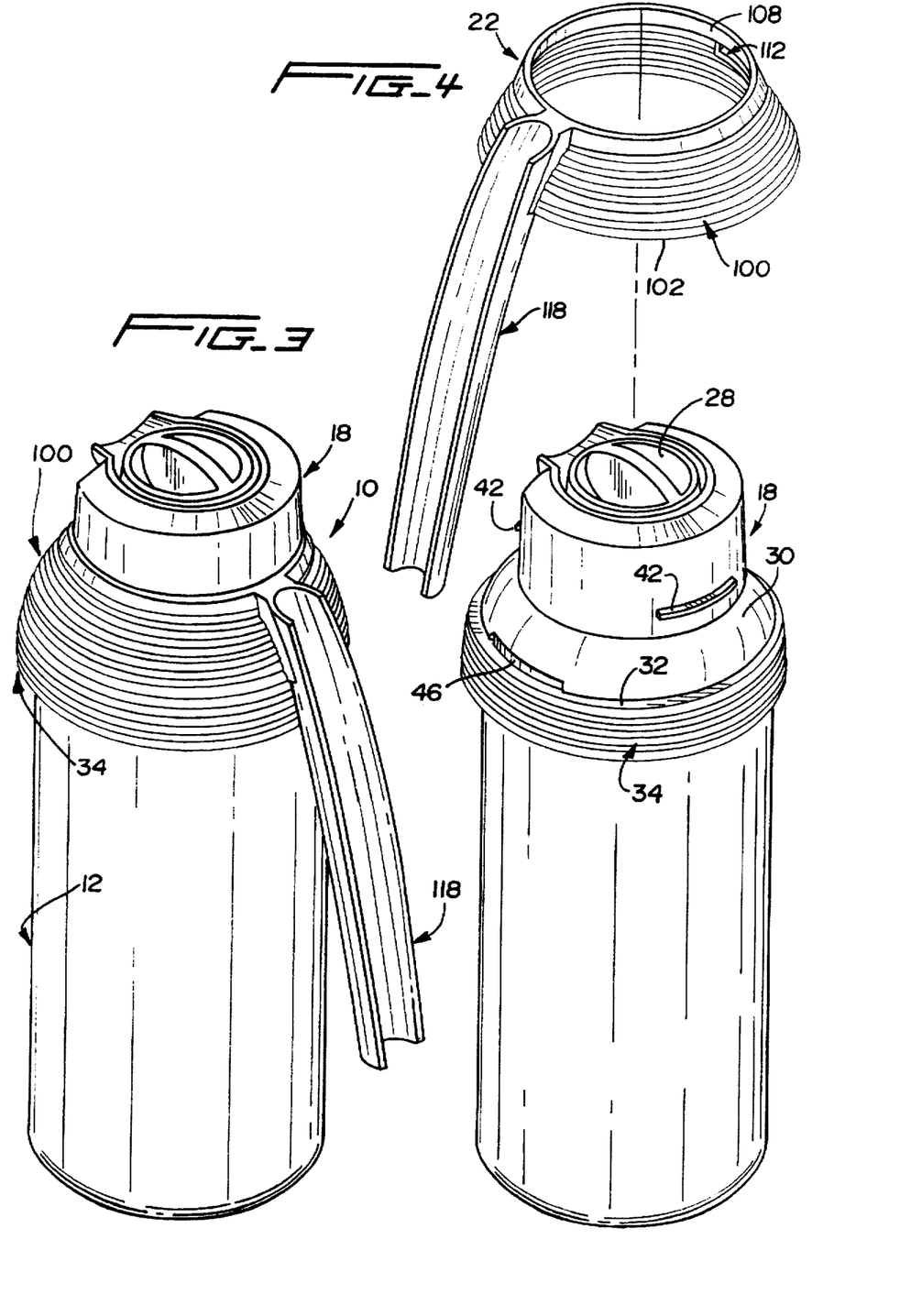
FIG. 3 is a perspective view of the flask with the pouring handle mounted thereon, in place of the cup assembly, and utilizing a mounting collar of the type used in the mounting of the cup assembly.
FIG. 4 is a perspective view of the flask with the handle assembly exploded therefrom.
Figures 12, 13:
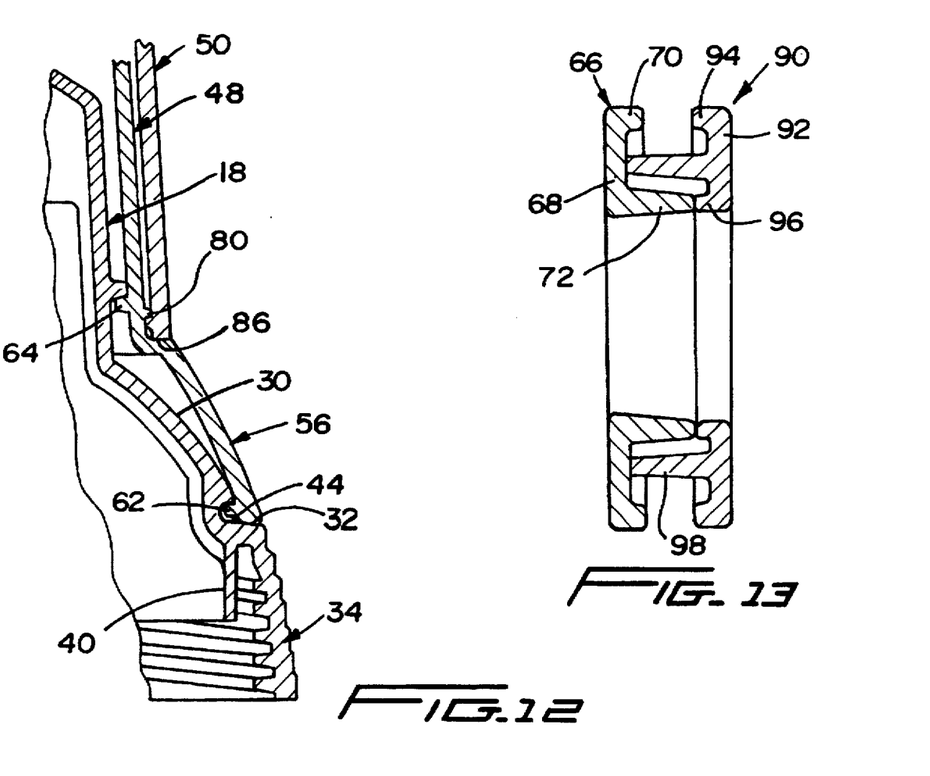
FIG. 12 is an enlarged vertical sectional detail illustrating the mounting of the cup assembly.
FIG. 13 is an enlarged cross-sectional detail through the nested handles of the cups of the cup assembly taken substantially on a plane passing along line 13—13 in FIG. 1.
Figure 14:
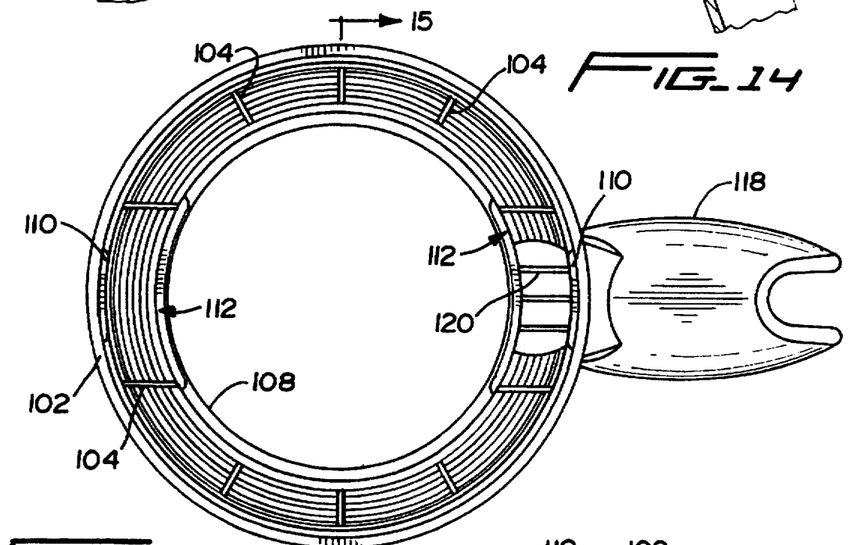
FIG. 14 is a bottom plan view of the handle assembly.
Figure 15:
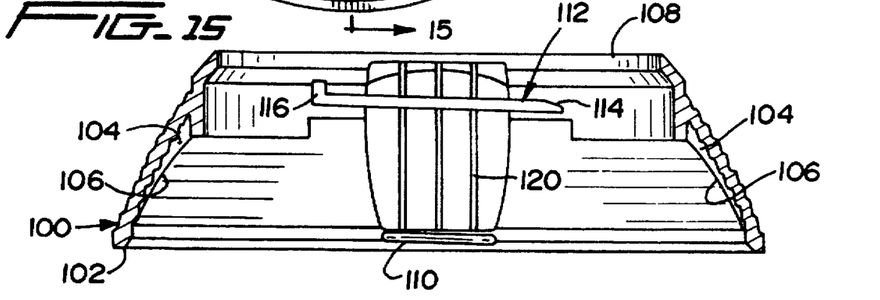
FIG. 15 is a vertical cross-sectional view through the handle assembly taken substantially on a plane passing along line 15—15 in FIG. 14.
Figure 16:
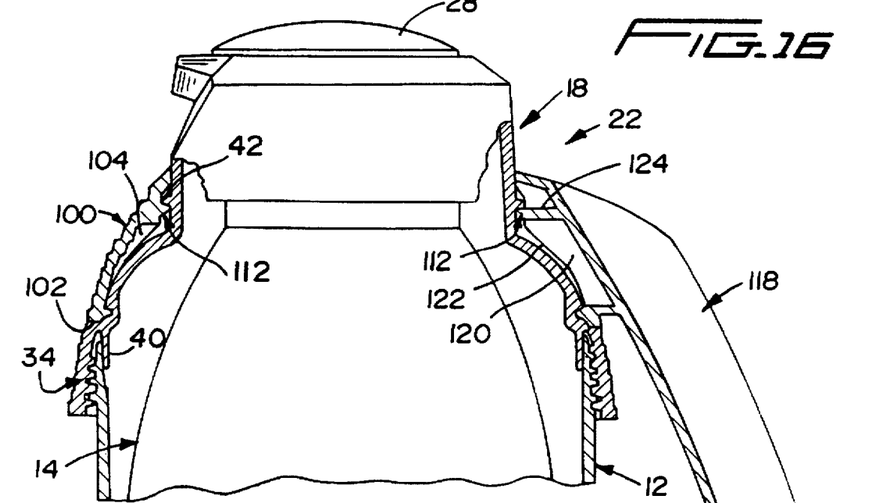
FIG. 16 is a cross-sectional detail through the upper portion of the flask illustrating the mounting of the handle assembly.

The handle 90 is positioned in radial alignment with one of the outer cup locking lugs 88 whereby upon a rotation of the outer cup 50 to its locked position on the inner cup 48, the handle 90, noting FIGS. 1 and 13 in particular, will nest with the handle 66. The height of the hub forming flanges 72 and 98 and the inner flange 96 of the handle 90 14. is such as to provide for a seating of the hub flange 98 against the inner face of the panel 68 of the handle 66, and a seating of the outer edge of the hub flange 72 against the outer edge of the flange 96 of the outer cup handle 90. The hub flange 72 and inner flange 96 of the respective handles form a continuous substantially constant diameter finger hole. Such an arrangement enhances the interlock between the inner land outer cups and provides for a smooth faced handle assembly by which the insulated flask can be carried. In addition, the nested handles will allow for a simple removal of the entire cup assembly, that is both cups, at the same time and with a single motion.

Attention is now directed to the handle assembly 22, best seen in FIGS. 3, 4, 14, 15 and 16. The handle assembly 22 includes a mounting collar 100 having an outwardly and downwardly arcing body, defining a configuration substantially the same as that of the cup collar 56. The lower edge 102 of the handle collar 100, when mounted, seats on the neck unit ledge 32 with the arc of the collar 100 conforming to and defining a vertical continuation of the arcing neck unit skirt 34. As will be best appreciated from FIG. 3, the external surface of the collar 100 is provided with a surface presentation, for example annular ribs or steps, which repeat that of the outer surface of the skirt 34, thus presenting the appearance of a continuous surface for an integrated appearance suggestive of a more formal handled pouring pitcher. For ease in the mold forming of the collar 100 and to minimize the actual material required, the collar 100 can be relatively thin with a corresponding ribbed or stepped inner surface and with vertically extending circumferentially spaced reinforcing ribs 104. The inner edges 106 of the ribs 104 are arcuate, generally following the arc of the neck unit shoulder 30 to supportively engage thereagainst upon a mounting of the handle assembly.

The relatively smaller upper peripheral edge portion 108 of the collar 100 presents a smooth vertical inner face adapted to closely receive the cylindrical wall of the neck 24 therethrough.

The handle collar 100 mounts to the neck unit 18 in substantially the same manner as the cup collar 56. Accordingly, the handle collar 100 includes, at diametrically opposed portions, circumferentially elongate inwardly projecting locking lugs 110 each of a length and thickness sufficient for introduction vertically downward through the opposed shoulder recesses 46 for rotational engagement within the communicating neck groove 44. As suggested in FIG. 15, the locking lugs 110 can be slightly inclined along the arcuate length thereof for a progressive wedging effect as the lugs move into the groove.

Additionally, a pair of relatively longer locking lugs 112 are integrally formed with and extend inward relative to the outer wall of the collar 100 sufficient as to engage immediately below the locking ribs 42 on the neck portion of the neck assembly. The lugs 112 are generally vertically aligned above the corresponding lower lugs 110 for a simultaneous engagement of the lugs 110 through the recesses 46 and the lugs 112 downward over the cylindrical outer surface of the neck portion 24 of the neck unit. So mounted, the handle collar 100, upon rotation, simultaneously engages the lugs 110 within the groove 44 and the lugs 112 beneath the ribs 42. In order to facilitate engagement of the lugs 112 beneath the neck ribs 42, the leading end of each lug 112 can be beveled as at 114. Further, to ensure a proper positioning of the handle assembly and a full locking thereof to the flask body, each of the lugs 112 can be provided with a short upstanding abutment 116 on the innermost end thereof which, upon a rotation of the handle collar 100 to its locked position, receives the corresponding end of a corresponding neck rib 42 thereagainst, thus signaling a full seated position.

The handle 118 of the handle assembly 22 is elongate and of a generally U-shaped cross-section along the length thereof from an upper end portion integrally molded with the collar 100 to a free lower end portion laterally outward of the container body for free access thereto by the hand of a user. Noting FIGS. 14–16 in particular, the arcuate wall of the collar 100 is, for molding purposes, discontinuous in the area of integral molding to the upper end portion of handle 118. This area is rigidified by relatively wider flanges or ribs 120 which are integral with the inner surface of the upper portion of the handle and project inwardly therefrom to terminate in arcuate inner edges 122 which generally conform to the outer surface of the neck assembly shoulder 30. The locking lug 112 which spans the handle mounting area is circumferentially coincident with the handle and is formed, at least in part, by the leading edge portion of an integral horizontal member 124 extending inward from the inner wall of the handle. For stability purposes, the ribs 120 will extend above the member 124 as well as therebelow.

From the forgoing, it will be appreciated that the insulated flask of the invention, utilizing interchangeable associate assemblies, can be used in the manner of a conventional Thermos container with one or two associated cups, or as an insulated pouring pitcher with the handle assembly appearing as an integral part of the flask itself. The two assemblies, preferably formed of an appropriate rigid synthetic resinous material, mount in the same manner and utilize substantially similar mounting collars requiring only a vertical dropping of the collar over the neck unit and a subsequent rotation thereof.

The foregoing is considered illustrative of the features of the invention, and the drawings, while intending to represent these features are not to be considered limiting on the scope of the invention. Rather, the scope of the invention is to be limited only by the claims hereinafter.

We claim:

1. A flask including a flask body having an open upper end, a neck unit engaged over said body upper end; said neck unit including a neck defining an upwardly opening mouth, a shoulder depending from said neck peripherally thereabout, and an outer skirt depending from said shoulder peripherally thereabout, a support between said skirt and said shoulder peripherally thereabout, said skirt surrounding said body at and adjacent said body upper end, said skirt being of a predetermined downward and outward expanded configuration; said flask further including a utility enhancing associate assembly removably receivable over said neck unit, said associate assembly including a collar surrounding said shoulder and engaging on said support above said skirt, said collar, upwardly from said support, forming a continuation of said skirt, and cooperating mounting means on said collar and said neck unit for releasably fixing said collar to said neck unit, said collar having inner and outer faces and an outer peripheral edge engaging said support, said mounting means comprising at least one locking lug on and projecting radially inward from said inner face of said collar, and companion means on said shoulder above said support for reception of said at least one lug upon rotation of said associate assembly and said at least one lug relative to said companion means wherein said associate assembly, upon introduction of said at least one lug to said companion means, is in releasable locking engagement with said neck unit, and wherein said associate assembly includes at least one additional locking lug upwardly spaced from said at least one lug and similarly radially inwardly projecting, said neck of said neck unit including an outwardly projecting rib thereon positioned to underlie said at least one additional locking lug upon a positioning of said associate assembly on said neck unit and a rotation of said associate assembly relative to said neck unit, said at least one additional locking lug engaging under said rib simultaneously with rotational engagement of said at least one locking lug with said companion means.

2. A flask including a flask body having an open upper end, a neck unit engaged over said body upper end; said neck unit including a neck defining an upwardly opening mouth, a shoulder depending from said neck peripherally thereabout, and an outer skirt depending from said shoulder peripherally thereabout, said skirt, at said shoulder, being outwardly offset to define a support ledge between said skirt and said shoulder peripherally thereabout, said skirt surrounding said body at and adjacent said body upper end, said skirt being of a predetermined downward and outward arcing configuration; said flask further including a utility enhancing associate assembly removably receivable over said neck unit, said associate assembly including a collar surrounding said shoulder and engaging on said support ledge above said skirt, said collar, upwardly from said support ledge, being inwardly arced and forming an arcing continuation of said skirt, and cooperating mounting means on said collar and said neck unit for releasably fixing said collar to said neck unit, said collar having inner and outer faces and an outer peripheral edge seating on said ledge, said mounting means comprising at least one locking lug on and projecting radially inward from said inner face of said collar, and a companion groove in said shoulder above said ledge for reception of said at least one lug therein, and means for introduction of said at least one lug into said groove at a predetermined section along said groove, wherein said associate assembly, upon introduction of said at least one lug into said groove, is rotated laterally for a releasable locking engagement of said at least one lug in said groove, said associate assembly further including at least one additional locking lug upwardly spaced from said at least one lug and similarly radially inwardly projecting, said neck of said neck unit including an outwardly projecting rib thereon positioned to underlie said at least one additional locking lug upon a positioning of said associate assembly on said neck unit and a rotation of said associate assembly relative to said neck unit, said at least one additional locking lug engaging under said rib simultaneously with rotational engagement of said at least one locking lug in said groove.

3. The flask of claim 2 wherein said at least one locking lug comprises a pair of diametrically opposed locking lugs, each with associated means for introduction thereof into said groove, said at least one additional locking lug comprising two diametrically opposed locking lugs, each with a separate associated rib on said neck.

4. The flask of claim 3 wherein said associate assembly comprises a cup assembly including a cup having a cup body with a peripheral outer edge portion, said collar being integral with said cup body outer edge portion and extending outwardly therefrom to the peripheral outer edge of said collar, said additional lugs being in said cup body inwardly thereof relative to said collar.

5. The flask of claim 4 wherein said collar, peripherally thereabout at said outer edge portion of said cup body, is outwardly offset relative to said cup body and defines a support shelf about said cup, said cup assembly including a second cup telescopically receivable over said first cup body and including a peripheral outer edge seating on said support shelf, said cup body of said first cup and said second cup having releasable locking means for locking said second cup to said first cup body upon relative rotation therebetween.

6. The flask of claim 5 wherein each of said first and second cups has a separate handle thereon, said cup handles aligning with each other with said second cup mounted over said first cup and selectively engaging and nesting upon rotation of said cups relative to each other to define a single handle unit.

7. The flask of claim 6 wherein the handle on said first cup is integral with said collar and extends therefrom along a portion of the adjoining cup body to at least partially lie immediately outward of the second cup received over said cup body, the second cup handle being integral with the second cup and projecting beyond the outer peripheral edge of said second cup to at least partially overlie said collar of said first cup.

8. The flask of claim 3 wherein said associate assembly comprises a handle assembly, said handle assembly including said collar and an elongate handle having an upper end fixed to said collar and depending therefrom and therebelow to a free lower end.

9. The flask of claim 8 wherein said neck unit skirt has an outer surface with a predetermined surface treatment, said outer face of said collar having a substantially duplicate surface treatment wherein said collar, when mounted, presents the appearance of an integral continuation of said skirt.

10. A flask including a flask body having an open upper end, a neck unit engaged over said body upper end; said neck unit including a neck defining an upwardly opening mouth, a shoulder depending from said neck peripherally thereabout, and an outer skirt depending from said shoulder peripherally thereabout, said skirt, at said shoulder, being outwardly offset to define a support ledge between said skirt and said shoulder peripherally thereabout, said skirt surrounding said body at and adjacent said body upper end, said skirt being of a predetermined downward and outward arcing configuration; said flask further including a utility enhancing associate assembly removably receivable over said neck unit, said associate assembly including a collar surrounding said shoulder and engaging on said support ledge above said skirt, said collar, upwardly from said support ledge, being inwardly arced and forming an arcing continuation of said skirt, and cooperating mounting means on said collar and said neck unit for releasably fixing said collar to said neck unit, said collar having inner and outer faces and an outer peripheral edge seating on said ledge, said mounting means comprising at least one locking lug on and projecting radially inward from said inner face of said collar, and a companion groove in said shoulder above said ledge for reception of said at least one lug therein, and means for introduction of said at least one lug into said groove at a predetermined section along said groove, wherein said associate assembly, upon introduction of said at least one lug into said groove, is rotated laterally for a releasable locking engagement of said at least one lug in said groove, said associate assembly comprising a cup assembly including a cup having a cup body with a peripheral outer edge portion, said collar being integral with said cup body outer edge portion and extending outwardly therefrom to the peripheral outer edge of said collar, said collar, peripherally thereabout at said outer edge portion of said cup body, being outwardly offset relative to said cup body and defining a support shelf about said cup, said cup assembly including a second cup telescopically receivable over said first cup body and including a peripheral outer edge seating on said support shelf, said cup body of said first cup and said second cup having releasable locking means for locking said second cup to said first cup body upon relative rotation therebetween, each of said first and second cups having a separate handle thereon, said cup handles aligning with each other with said second cup mounted over said first cup and selectively engaging and nesting upon rotation of said cups relative to each other to define a single handle unit.

11. A flask including a flask body having an open upper end, a neck unit engaged over said body upper end; said neck unit including a neck defining an upwardly opening mouth, a shoulder depending from said neck peripherally thereabout, and an outer skirt depending from said shoulder peripherally thereabout, said skirt surrounding said body at and adjacent said body upper end; said flask further including a utility enhancing associate assembly removably receivable over said neck unit, said associate assembly including a collar surrounding said shoulder above said skirt, said collar, upwardly from said skirt, forming a continuation of said skirt, and cooperating mounting means on said collar and said neck unit for releasably fixing said collar to said neck unit, said collar having inner and outer faces and an outer peripheral edge, said mounting means comprising at least one locking lug on and projecting radially inward from said inner face of said collar, and companion means on said shoulder for reception of said at least one lug upon rotation of said associate assembly and said at least one lug relative to said companion means, wherein said associate assembly, upon introduction of said at least one lug to said companion means, is in a releasable locking engagement with said neck unit, said associate assembly comprising a cup assembly including a cup having a cup body with a peripheral outer edge portion, said collar being integral with said cup body outer edge portion and extending outwardly therefrom to the peripheral outer edge of said collar, said collar, peripherally thereabout, being outwardly offset relative to said cup body and defining a support shelf about said cup, said cup assembly including a second cup telescopically receivable over said first cup body and including a peripheral outer edge seating on said support shelf, said cup body of said first cup and said second cup having releasable locking means for locking said second cup to said first cup body upon relative rotation therebetween, each of said first and second cups having a separate handle thereon, said cup handles aligning with each other with said second cup mounted over said first cup and selectively engaging and nesting upon rotation of said cups relative to each other to define a single handle unit.

12. A cup assembly for an insulated flask, said cup assembly comprising an inner cup and an outer cup, said inner cup comprising a substantially cylindrical cup body with an outer peripheral edge, a collar having a first edge integral with said outer edge of said cup body peripherally thereabout, said collar also having a free outer peripheral edge, said collar, outward from said cup body, being transversely arcuate between the first edge thereof and the free outer edge, said free outer edge of the collar being of a greater diameter than that of the first edge of the collar, and a handle integral with said collar and extending outwardly therefrom to at least partially overlie said inner cup body with an access slot defined therebetween, said outer cup being telescopically received over said inner cup and having an outer peripheral edge supported on said inner cup at said first edge of said collar, said outer cup having a handle integral therewith and extending beyond the peripheral edge of said outer cup to overlie said collar of said inner cup.

13. The cup assembly of claim 12 wherein said outer cup is received within said slot and said handles are circumferentially aligned, and wherein, upon rotation of said cups relative to each other, said handles engage to define a single handled unit.

14. The cup assembly of claim 13 wherein each of said handles includes a projecting hub, said hubs nesting within each other and partially interlocking said handles.

15. An insulated flask kit comprising an upwardly opening flask body with a neck unit mounted thereon and thereover to define a pouring mouth, a cup assembly, and a handle assembly, said cup assembly and said handle assembly being interchangeable, each of said cup assembly and said handle assembly including a mounting collar vertically receivable over said neck unit, mounting means on each collar for releasably engaging the collar to said neck unit upon relative rotation of the collar to the neck unit, said collars being similarly configured and similarly mountable to said neck unit, and lock means on said neck unit for independently and selectively cooperating with the mounting means on each collar for alternately locking said cup assembly and said handle assembly on said neck unit.

16. An insulated flask kit comprising an upwardly opening flask body with a neck unit mounted thereon and thereover to define a pouring mouth, a cup assembly, and a handle assembly, said cup assembly and said handle assembly each including a mounting collar vertically receivable over said neck unit and releasably lockable to said neck unit upon relative rotation of the collar to the neck unit, said collars being similarly configured and similarly mountable to said neck unit, and lock means on said neck unit independently and selectively cooperating with each collar wherein said cup assembly and said handle assembly can be alternately mounted on said neck unit, said cup assembly comprising combined inner and outer cups, said inner cup having the associated collar integrally formed therewith, each cup having a cup handle, said cup handles, upon relative rotation of said cups to each other, nesting to form a single handle unit, said handle assembly including an elongate handle having a first upper end integral with the associated collar and a lower free end positionable in outwardly spaced relation to said flask body below said neck unit.

* * * * *